US012636855B2

(12) United States Patent
Chen et al.

(10) Patent No.: US 12,636,855 B2
(45) Date of Patent: May 26, 2026

(54) PRE-APPLIED MEMBRANE WITH ANTI-SUBMARINING LAYER

(71) Applicant: GCP Applied Technologies Inc., Cambridge, MA (US)

(72) Inventors: Huhe Chen, Beijing (CN); Hongmei Ding, Beijing (CN); Robert A. Wiercinski, Lincoln, MA (US); Xia Cao, Acton, MA (US); Jyoti Seth, Andover, MA (US)

(73) Assignee: GCP Applied Technologies Inc., Malvern, PA (US)

( * ) Notice: Subject to any disclaimer, the term of this patent is extended or adjusted under 35 U.S.C. 154(b) by 1086 days.

(21) Appl. No.: 17/311,924

(22) PCT Filed: Dec. 11, 2018

(86) PCT No.: PCT/CN2018/120268
§ 371 (c)(1),
(2) Date: Jun. 8, 2021

(87) PCT Pub. No.: WO2020/118515
PCT Pub. Date: Jun. 18, 2020

(65) Prior Publication Data
US 2022/0025643 A1      Jan. 27, 2022

(51) Int. Cl.
*B32B 5/30*          (2006.01)
*B32B 7/12*          (2006.01)
(Continued)

(52) U.S. Cl.
CPC .................. *B32B 5/30* (2013.01); *B32B 7/12* (2013.01); *B32B 27/12* (2013.01); *B32B 27/14* (2013.01);
(Continued)

(58) Field of Classification Search
CPC .. B32B 5/30; B32B 7/12; B32B 27/12; B32B 27/14; B32B 2250/02; B32B 2255/04;
(Continued)

(56) References Cited

U.S. PATENT DOCUMENTS

| 3,741,856 A | 6/1973 | Hurst |
| 3,900,102 A | 8/1975 | Hurst |

(Continued)

FOREIGN PATENT DOCUMENTS

| CN | 108463598 | 8/2018 |
| WO | 2014029763 | 2/2014 |
| WO | 2017058154 | 4/2017 |

OTHER PUBLICATIONS

Meng, Form PCT/ISA/210, International Search Report for PCT/CN2018/120268, Aug. 21, 2019, 5 pages.
(Continued)

*Primary Examiner* — Betelhem Shewareged
(74) *Attorney, Agent, or Firm* — Armstrong Teasdale LLP

(57) ABSTRACT

A membrane(10) for waterproofing a substrate and a method for waterproofing a substrate using the membrane (10), where the membrane (10) comprising a laminate construction wherein the laminate comprises a carrier sheet (12), a pressure-sensitive adhesive (PSA) layer (14), a particulate layer (16) partially embedded into the PSA layer (14), and a protective top-coating layer (18) attached to the particulate layer (16), the laminate having parallel side edges whereby the laminate construction can be rolled into a roll form along the side edges for shipment.

17 Claims, 3 Drawing Sheets

10

18
16
14
12

(51) Int. Cl.
 *B32B 27/12* (2006.01)
 *B32B 27/14* (2006.01)

(52) U.S. Cl.
 CPC ....... *B32B 2250/02* (2013.01); *B32B 2255/04* (2013.01); *B32B 2255/26* (2013.01); *B32B 2307/7265* (2013.01); *B32B 2307/732* (2013.01); *B32B 2419/00* (2013.01)

(58) Field of Classification Search
 CPC ........ B32B 2255/26; B32B 2307/7265; B32B 2307/732; B32B 2419/00
 USPC ........................................................ 428/143
 See application file for complete search history.

(56) References Cited

U.S. PATENT DOCUMENTS

| | | | |
|---|---|---|---|
| 4,172,830 A | 10/1979 | Rosenberg et al. | |
| 4,215,160 A | 7/1980 | Rosenberg et al. | |
| 4,239,795 A | 12/1980 | Haage et al. | |
| 4,994,328 A | 2/1991 | Cogliano | |
| 5,112,678 A | 5/1992 | Gay et al. | |
| 5,316,848 A | 5/1994 | Bartlett et al. | |
| 5,496,615 A | 3/1996 | Bartlett et al. | |
| 6,500,520 B1 | 12/2002 | Wiercinski et al. | |
| 7,968,171 B2 | 6/2011 | Seth et al. | |
| 8,298,661 B2 | 10/2012 | Samanta et al. | |
| 8,453,405 B2 | 6/2013 | Wiercinski et al. | |
| 8,475,909 B2 | 7/2013 | Seth et al. | |
| 8,609,213 B2 | 12/2013 | Wiercinski et al. | |
| 8,713,879 B2 | 5/2014 | Wiercinksi et al. | |
| 8,931,228 B2 | 1/2015 | Wiercinksi et al. | |
| 8,931,229 B2 | 1/2015 | Wiercinksi et al. | |
| 9,133,612 B2 | 9/2015 | Wiercinski et al. | |
| 9,394,464 B2 | 7/2016 | Wiercinksi et al. | |
| 9,476,196 B2 | 10/2016 | Wiercinksi et al. | |
| 2012/0180933 A1* | 7/2012 | Wiercinski | B32B 27/08 |
| | | | 428/351 |
| 2013/0008124 A1* | 1/2013 | Wiercisnki | E04B 1/665 |
| | | | 428/143 |
| 2013/0037989 A1* | 2/2013 | Wiercinski | C09J 7/20 |
| | | | 428/68 |
| 2016/0040440 A1 | 2/2016 | Wiercinski et al. | |
| 2016/0264824 A1 | 9/2016 | Zoller | |
| 2017/0369264 A1 | 12/2017 | Yoshida et al. | |
| 2018/0022645 A1 | 1/2018 | Hans | |
| 2018/0030283 A1 | 2/2018 | Xiong et al. | |
| 2018/0282997 A1 | 10/2018 | Chen et al. | |
| 2022/0025643 A1* | 1/2022 | Chen | E04D 5/06 |

OTHER PUBLICATIONS

Meng, Form PCT/ISA/237, Written Opinion of the International Searching Authority for PCT/CN2018/120268, Sep. 4, 2019, 5 pages.

\* cited by examiner

PRE-APPLIED MEMBRANE WITH ANTI-SUBMARINING LAYER

FIELD OF THE INVENTION

The invention relates to waterproofing and moisture protection for building structures, and more particularly to a waterproofing membrane having a carrier sheet, a pressure sensitive adhesive layer, a reactive particulate layer, and an outer protective coating layer which prevents the reactive particulates from "submarining" into the adhesive layer when the membrane is rolled for shipment.

BACKGROUND OF THE INVENTION

In international Publication Number WO 2017/058154 A1 of Chen et al. (owned by the common assignee hereof), a pre-applied waterproofing membrane was disclosed for bonding to post-cast concrete and facilitating sealing at membrane-to-membrane overlaps.

The membrane comprised a carrier sheet and pressure-sensitive adhesive (PSA) layer, an inorganic particle layer having particulate bodies which were partially embedded in the PSA and which had an average particle size less than the average thickness of the PSA layer, and an "anti-submarining" nano-silica-containing coating attached to the un-embedded portions of the inorganic particles to prevent total embedment into the PSA layer when the membrane was rolled for shipment, and to allow for water-tight seams at overlapping portions of adjacent membranes. A water-tight seam could be achieved by using detailing or waterproofing tape, preferably without using primer, mastic, or additional coating.

The present invention provides novel and inventive improvement over the approach taught in WO '154 by taking a counter-intuitive approach to pre-applied membrane design, as will be further explicated in the ensuing section.

SUMMARY OF THE INVENTION

Exemplary pre-applied waterproofing membranes of the present invention employ a layer of reactive particles comprising aluminum oxide trihydrate (alternatively referred to as "alumina trihydrate") particles ("ATH") that are partially embedded within an underlying pressure-sensitive adhesive layer, the ATH particles having unembedded portions coated by an outer polymeric protective coating layer. Against the outer protecting coating, wet concrete is post-cast and allowed to cure against the membrane(s). A number of advantages are attained by this approach in comparison to the use of the nano-silica top coating taught in WO 2017/058154 A1.

The membrane-to-membrane bonding strength of waterproofing membranes of WO 2017/058154 A1 was determined by the present inventors to be approximately 0.6-0.7 N/mm when tested in accordance with ASTM D1876 (2015). In contrast, exemplary membranes of the present invention were found to have membrane-to-membrane bonding strength of 1.0-1.2 N/mm when tested by the same method.

This increased bonding strength performance means that, under real world conditions, the waterproofing membranes of the present invention should have greater immunity to dust, dirt, water immersion, high temperature, and other detrimental conditions and elements typically existing at construction sites.

In addition to omitting a nano-silica top coating layer, the present inventors used a protective polymer top-coating having an average thickness of 0.01 mm to 0.20 mm, which is much thicker than the outer nano-silica top-coating taught in WO 2017/058154 A1. Despite the greater thickness, the polymer top coating layer did not impede the satisfactory bonding of ATH particles with post-cast concrete.

The thicker polymeric outer protective coating also provided better blocking resistance during shipment and increased flexibility and elongation compared to the nano-silica top coating taught in the prior art, allowing the membrane to adopt more easily to dimensional irregularities and surface details (e.g., corners) when the membrane is installed at a jobsite.

An additional benefit is that the outer polymer protective coating layer possesses greater toughness as compared to inorganic nano-silica particles. For example, the outer polymer coating layer showed better scrub resistance, having survived 20,000 scrubs during testing under China Code GB/T 9266-2009. Given that earlier approaches tended to rely on the use of inorganic particles in the outer coating layer or as high filler content, the excellent scrub resistance of the outer polymer coating was an added benefit.

An exemplary membrane of the invention comprises:

a laminate construction wherein the laminate comprises a carrier sheet, a pressure-sensitive adhesive (PSA) layer, a particulate layer partially embedded into the PSA layer, and a protective top-coating layer attached to the particulate layer, the laminate having parallel side edges whereby the laminate construction can be rolled into a roll form for shipment;

the carrier sheet having an average thickness of 0.20 to 2.0 mm;

the PSA layer attached to the carrier sheet and having an average thickness of 0.1 to 1.0 mm;

the particulate layer partially embedded into the PSA layer and comprising aluminum oxide trihydrate (ATH) particles having an average mean diameter of 50 to 200 microns, the particulate layer having a coating weight in the range of 10 to 300 grams per square meter; and the protective top-coating layer covering the partially embedded ATH particles and portion of unembedded PSA layer, the protective top-coating layer being substantially devoid of nano-silica (i.e., no more than 0-0.25% by weight), the protective top-coating layer comprising a polymer chosen from acrylic, polyvinylacetate, acrylate/styrene copolymer, acrylate/vinyl acetate copolymer, chloroprene, butyl rubber, styrene-butadiene copolymer, SEBS, or mixture thereof; and the protective top-coating layer further comprising a filler in the amount of 10% to 80% by weight and having an average thickness of 0.01 to 0.20 mm.

The invention also provides an exemplary method, comprising: attaching the above-described membrane to a substrate (e.g., a lagging form, wall, earth, foundation, tunnel waft, or other structure) such that its PSA, particles layer, and top-coating layer are facing outwards; and casting concrete against the PSA side and allowing it to cure, thereby forming a bond between the concrete and membrane.

Further advantages and features of the invention are described in detail hereinafter.

BRIEF DESCRIPTION OF THE DRAWINGS

An appreciation of the benefits and features of the present invention may be more readily comprehended by considering the following written description of exemplary embodiments in conjunction with the drawings, wherein.

DETAILED DESCRIPTION OF EXEMPLARY EMBODIMENTS

Figure 1:
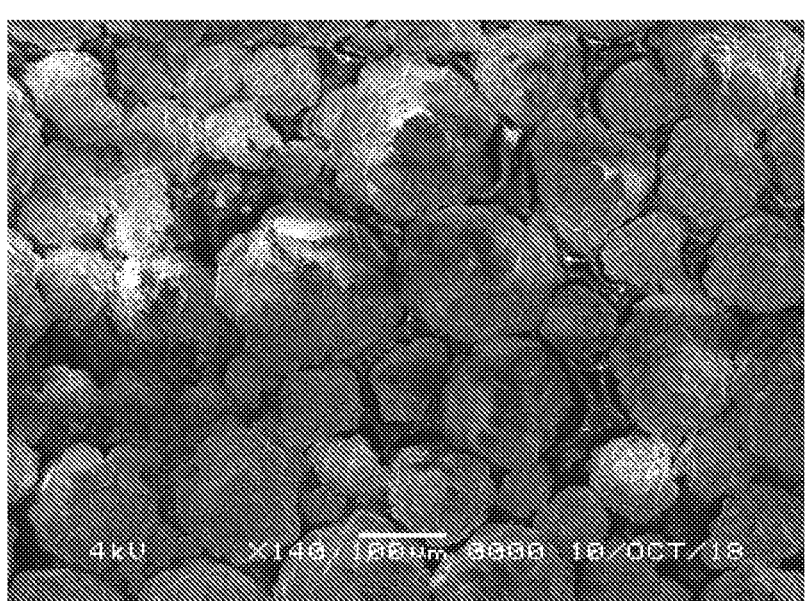
FIG. 1 is a photograph of a PRIOR ART pre-applied waterproofing membrane outer layer of (uncoated) aluminum oxide trihydrate particles that partially embedded into a pressure sensitive adhesive (PSA) layer according to U.S. Pat. No. 6,500,520.

FIG. 1 is a SEM image of PRIOR ART pre-applied waterproofing membrane, originally disclosed in U.S. Pat. No. 6,500,520, which comprises a flexible carrier sheet, pressure-sensitive adhesive (PSA) layer, and a particulate layer of 25 to 1000 microns. If particle size is less or equal to 100u, the present inventors believe that a major shortcoming is that the membrane will require a release liner to prevent blocking, or, in other words, one layer of membrane sticking to an adjacent layer in the roll. Another shortcoming of this approach, as evident in FIG. 1, the particulate does not offer complete protection for the adhesive layer because it does not cover the entire (100%) of the outwardly disposed adhesive surface.

Figure 2:
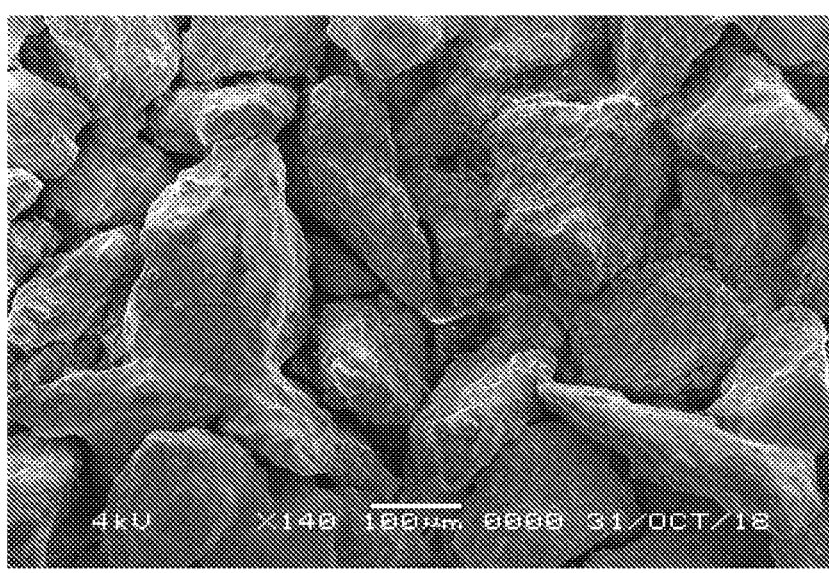
FIG. 2 is a photograph of a PRIOR ART pre-applied waterproofing membrane outer layer according to WO 2017/058154 A1.

FIG. 2 is a SEM image of PRIOR ART pre-applied waterproofing membrane, as disclosed in US Patent WO 2017/058154 A1. The membrane comprises a carrier sheet, a pressure-sensitive adhesive (PSA) layer, an inorganic particle layer having with an average particle size less than the average thickness of the PSA layer, and an "anti-submarining" nano-silica-containing coating layer attached to the un-embedded portions of the inorganic particles.

As shown in FIG. 2, the "anti-submarining" nano-silica-containing coating layer is not continuous. It cannot offer complete protection for the adhesive layer.

FIG. 2 also shows that the topcoat has cracking issue which further deteriorates the protection function of the topcoat.

Figure 3:
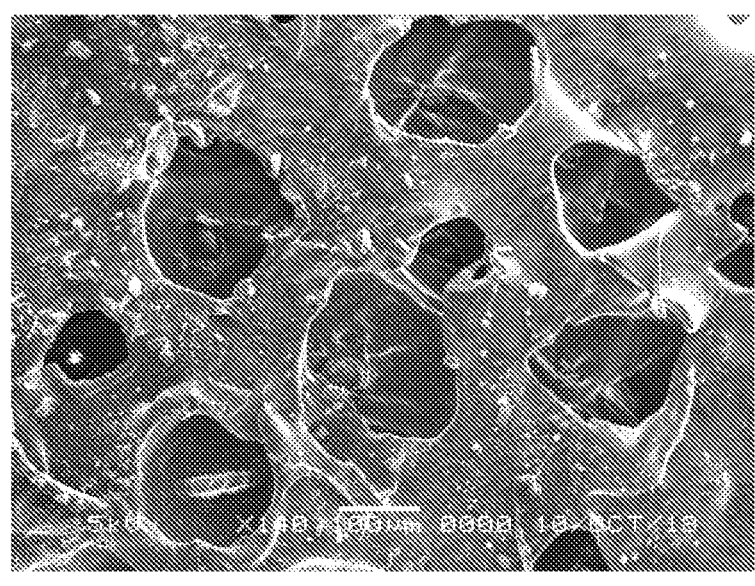
FIG. 3 is a photograph of a PRIOR ART pre-applied waterproofing membrane having an outer polyvinyl acetate coating layer with filler particles (up to 35%) according to US 2016/0040440.

FIG. 3 is SEM image of a PRIOR ART pre-applied membrane according to US patent 2016/0040440. This waterproofing membrane comprises a carrier sheet, a pressure sensitive adhesive layer on one surface of the carrier sheet, and a poly vinyl acetate (PVAc) protective coating with 30% of TiO2 as filler.

As shown in FIG. 3, the PVAc coating layer showed cracks or holes due to low flexibility of the polymer latex and high filler content in the coating.

Figure 4:
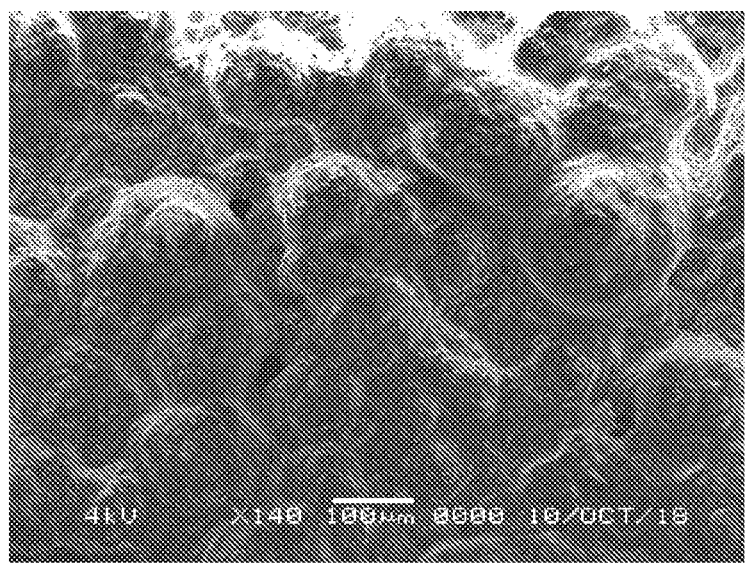
FIG. 4 is a photograph of an exemplary membrane of the present invention having an outer polymer protecting coating that covers a layer of reactive particles comprising aluminum oxide trihydrate ("ATH") particles that are partially embedded within an underlying pressure-sensitive adhesive layer.

FIG. 4 is a SEM image of present invention, a waterproofing membrane that comprises a carrier sheet, a pressure sensitive adhesive layer, ATH particulate layer and an acrylic polymer layer. FIG. 4 showed that the elastomeric acrylic polymer layer formed continuous coating over the particulate and PSA, providing good protection during membrane exposure in the jobsite and eliminate blocking issue in the process of long distance shipment.

Figure 5:
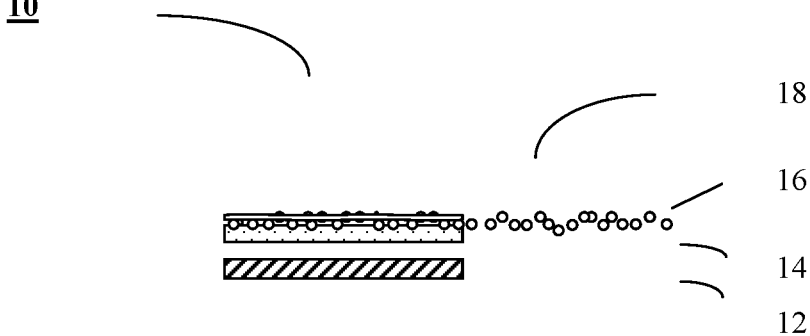
FIG. 5 is a side-perspective plan diagram of an exemplary waterproofing membrane of the present invention.

FIG. 5 illustrates an exemplary pre-applied waterproofing membrane 10 of the present invention which comprises a flexible carrier sheet 12 having two major faces; a pressure-sensitive adhesive layer (PSA) 14 having two major faces, one major face of which is attached to one of said carrier sheet 12 major faces; an aluminum oxide trihydrate particle layer 16 having individual particulate bodies which have an average size (diameter) that is less than the average thickness of the PSA layer 14 and which are partially-embedded into the PSA layer 14 opposite the major face which is attached to the carrier sheet 12; and a flexible protective coating layer 18 which is formed upon the portion of the un-embedded particulate bodies 16. Preferably, the flexible protection coating layer 18 is formed by coating at least one polymeric film forming material with various levels of fillers and additive onto the exposed individual particulate bodies of the aluminum oxide tri-hydrate particle layer 16 and allowing the coating layer 18 to dry.

Exemplary flexible carrier sheets 12 most suitable for the present invention should provide mechanical strength and waterproofing integrity for the membrane 10.

Exemplary carrier sheets 12 typically have a thickness of 0.2 to 2.0 mm, and, more preferably, 0.5 to 1.0 mm. Examples of the carrier sheet or layer 12 should further have a generally smooth surface, such as films, sheets, woven or non-woven fabrics. Suitable materials include polypropylene, polyethylene, ethylene-propylene copolymers, ethylene-olefin copolymers, ethylene-vinyl acetate copolymers, polyvinyl acetate, polyethylene terephthalate (PET), polyvinyl chloride (PVC), thermoplastic polyolefin (TPO) and combinations thereof. Polyethylene and polypropylene are preferred.

An exemplary pressure-sensitive adhesive (PSA) layer 14 provides waterproofing integrity for the waterproofing membrane 10. The PSA layer 14 functions to bond the AOT inorganic particle layer 16 to the carrier sheet 12, and should have a thickness of 0.1 to 1.0 mm, more preferably about 0.2 to 0.5 mm.

Either rubber modified bituminous adhesive or synthetic polymer based adhesive can be used for present invention.

Exemplary synthetic polymer adhesive contemplated for use in the PSA layer 14 may be chosen from butyl rubber, polyisobutylene, styrene-isoprene-styrene (SIS), styrene-ethylene-butylene-styrene (SEBS), styrene-butadiene-styrene (SBS), styrene-butadiene rubber (SBR), and combinations thereof.

Preferably, the synthetic adhesive used in the PSA layer 14 is a pressure sensitive hot melt adhesive block copolymer chosen from SIS, SBS, SEBS, or mixture thereof.

Exemplary synthetic adhesive layers 14 can optionally contain additives which are typically used in waterproofing membranes, including, without limitation, light absorbers (e.g., carbon black, benzotriazoles, etc.), light stabilizers (e.g. hindered amine, benzophenone), antioxidants (e.g. hindered phenol), fillers (e.g., calcium carbonate, silica, titanium dioxide, etc.), plasticizers, rheological additives, and mixtures thereof. Preferred combinations are synthetic PSA composition layer comprising light absorber, light stabilizer, antioxidant, or mixtures thereof.

Another example of pressure-sensitive adhesive (PSA) 14 includes one or more amorphous polyolefins. An amorphous polyolefin (APO) is defined as a polyolefin with a degree of crystallinity of less than 30% as measured by differential scanning calorimetry. These polymers can be either homopolymers of propylene or copolymers of propylene with one or more α-olefin comonomer, for example, ethylene, 1-butene, 1-hexene, 1-octene and 1-decene. The APO polymers of the types herein described above are commercially available from Eastman Chemical Company, Kingsport, Tennessee, under the trade name designation EASTOFLEX™ or from Huntsman Corporation, Houston, Texas, under the trade name designation REXTAC™ or from Degussa Corporation, Parsippany, New Jersey, under the trade name designation VESTOPLAST™. Like rubber-based adhesives, the polymers are also combined using a tackifier and plasticizer to produce a PSA composition which can be coated onto the carrier sheet 12 or which can be a pre-formed layer 14 that can be laminated (nipped or extruded) onto the carrier sheet 12. See e.g., Eastman bulletin "Pressure-Sensitive Adhesives Based on Amorphous Polyolefin From Eastman Chemical Company."

The most preferred inorganic particle layer 16 of present invention comprises alumina oxide trihydrate ("ATH") with average particle size of 50 to 200 microns and coverage weight of 10 to 300 gram per square meter.

Exemplary ATH particles are attached to, but after embedment into the PSA layer are partially exposed on the PSA layer. The ATH particulate layer has several functions. First of all, it increases the relative surface area against which cast concrete can bond (e.g., in combination with the PSA layer 14) and provides a rough substrate for subsequent protective coating to anchor and bond against (as compared to PSA alone). The ATH particulate layer also keeps the membrane surface cooler and blocks damaging UV radiation, minimizing the rate of degradation of the PSA layer 14 by sunlight.

The ATH particles 16 also prevent blocking and eliminate the need for a removable release liner for protecting the PSA layer (e.g., wax or siliconized paper). Removed liner sheets generate waste and involve an extra clean up step during installation.

The ATH particles (16) also can improve foot-slip resistance of the membrane 10 as well as traffic-ability (durability for foot traffic) of the membrane 10 during installation.

Finally, as previously discussed, waterproofing membranes 10 of the present invention comprises a more flexible anti-submarining coating layer 18 which provides further protection for the adhesive layer 14. The coating layer 18 also helps to fix the fine particle layer 16 to facilitate the establishment of water-tight seams at the end-laps between adjacent waterproofing membranes 10 by the applicator.

Exemplary flexible anti-submarining coating layer 18 comprises at least one film-forming polymer latex, inorganic fillers and various additives.

Suitable polymer latex in emulsion form may include polymer of acrylates, polyvinyl acetate, acrylate/styrene copolymers, acrylate/vinyl acetate copolymers and mixtures thereof. Polymer of acrylates are most preferred. To ensure better coverage, the flexible anti-submarining topcoat should have a dry coating weight of 10-300 grams per square meter, and more preferably, 30-100 grams per square meter.

Exemplary flexible anti-submarining topcoat layer 18 may comprise 20-80% by weight of various filler and additives. Preferred fillers in the coating layer 18 may be chosen from calcium carbonate, magnesium carbonate, titanium dioxide, dolomite, wollastonite, barium sulfate, crystalline or amorphous silica, bentonites, talc, etc.

The flexible topcoat layer 18 can optionally contain various other additives, such as thickener, dispersing agent, anti-mold agent, de-foaming agent, film coalescing aid, as may be preferred by the membrane designer, according to application needs.

As previously described, exemplary anti-submarining topcoat layer 18 in the present invention is more flexible comparing to the nano-silica containing topcoat disclosed in WO 2017/058154 A1. As an indicator of the elasticity of anti-submarining topcoat layer 18, the elongation of the topcoat was measured after casting 1.0-1.5 mm coating. The topcoat in the present invention exhibits 50 to 500% of elongation; while the topcoat layer containing nano-silica described in WO 2017/058154 A1 shows elongation of less than 20% when tested by the same method. A more flexible topcoat exhibit many advantages.

A flexible protection coating 18 of preferred embodiments achieve good coverage over the hills and valleys of the ATH particulates, and creates a water-tight, weather-resistant, flexible interface on the particulate layer, which confers better resistance to cracks when the membrane 10 is folded for installation at irregular areas in the jobsite. The protection coating 18 layer is also more tolerant to the carrier sheet dimension change due to temperature fluctuation outside. Another advantage of flexible protection coating is that one can increase the thickness of coating without cracking issue.

The flexible topcoat showed good UV resistance performance. After exposure for 2/4/6/8 weeks in real climate in hot summer season, the topcoat layer does not show any cracks on the surface. And the bonding strength is excellent when cast concrete against a strip of the membrane 10 of the invention and allow the concrete to cure for one week.

Bonding strength is excellent even after the membrane has been immersed in water. To test this advantageous property, the present inventors cast concrete against a strip of the membrane 10 of the invention and allowed the concrete to cure for seven days. The assembly was then immersed in water for 30/60/90 days. The bond between membrane 10 and concrete after a period of water immersion was measured and compared to that for an assembly that had not been immersed in water, and the bond was found to be very good.

The side lap (the lap along the machine direction of the membrane) of the waterproofing membrane in the current invention includes overlapping width of 70-120 mm. The side lapping treatment methods include self-adhesive or adhesive tape or welding. For the self-adhesive side lap, a release liner is necessary (but only at the edges of the membrane) to protect the adhesive before installation. Thus, at the construction site, it is only necessary to remove the side edge liners at the appropriate time. Adhesive to adhesive bonding at overlapped portions of adjacent membranes is the most preferred treatment method as it will provide even higher bonding strength.

Various exemplary embodiments are described as follows.

In a first example embodiment, a membrane for waterproofing a substrate, comprises:

a laminate construction wherein the laminate comprises a carrier sheet, a pressure-sensitive adhesive (PSA) layer, a particulate layer partially embedded into the PSA layer, and a protective top-coating layer attached to the particulate layer, the laminate having parallel side edges whereby the laminate construction can be rolled into a roll form along the side edges for shipment;

the carrier sheet having an average thickness of 0.20 to 2.0 mm;

the PSA layer attached to the carrier sheet and having an average thickness of 0.1 to 1.0 mm;

the particulate layer partially embedded into the PSA layer and comprising aluminum oxide trihydrate (ATH) particles having an average mean diameter of 50 to 200 microns, the particulate layer having a coating weight in the range of 10 to 300 grams per square meter; and the protective top-coating layer covering the partially embedded ATH particles and portion of unembedded PSA layer, the protective top-coating layer being substantially devoid of nano-silica (i.e., no more than 0-0.25% by weight), the protective top-coating layer comprising a polymer chosen from acrylic, polyvinylacetate, acrylate/styrene copolymer, acrylate/vinyl acetate copolymer, chloroprene, butyl rubber, styrene-butadiene copolymer, SEBS, or mixture thereof; and the protective top-coating layer further comprising a filler in the amount of 10% to 80% by weight and having an average thickness of 0.01 to 0.20 mm.

In a second example embodiment, which may be based on the first example embodiment, the membrane does not have a release liner or paper except along the side edges of the membrane which are devoid of the particulates and the protective-top coating.

In a first aspect of the second example embodiment, the side edges of the membrane comprise only the carrier sheet. In other words, the side edges of the membrane do not include PSA layer, particulate layer, or top-coating layer. This construction more readily permits use of tape, such as two-sided tape, or welding (e.g., hot air welding, extrusion welding, etc.) to join and seal together an adjacent membrane.

In a third example embodiment, which may be based on any of the first through second example embodiments, the carrier sheet comprises a polymer film, woven fabric, non-woven fabric, or combination thereof.

In a fourth example embodiment, which may be based on any of the first through third example embodiments, the carrier sheet comprises a fabric layer sandwiched between two polymer film layers.

In a fifth example embodiment, which may be based on any of the first through fourth example embodiments, the carrier sheet has an average thickness of 0.2 to 2.0 mm; more preferably 0.3 to 1.5 mm; most preferably 0.5 to 1.0 mm.

In a sixth example embodiment, which may be based on any of the first through fifth example embodiments, the carrier sheet comprises polypropylene, polyethylene, ethylene-propylene copolymers, ethylene-olefin copolymers, ethylene-vinyl acetate copolymers, polyvinyl acetate, polyethylene terephthalate (PET), polyvinyl chloride (PVC), thermoplastic polyolefin (TPO), or a mixture of any of the foregoing polymers or co-polymers.

In a seventh example embodiment, which may be based on any of the first through sixth example embodiments, the membrane has a carrier sheet which is a multilayer laminate having at least two layers, each of the at least two layers comprising a different polymer or polymer combination. In a first aspect of this seventh example embodiment, the carrier sheet is a multilayer polymer laminate comprises a layer of high density polyethylene (HDPE) sandwiched between two layers of low density polyethylene (LDPE), which the present inventors believe would facilitate overlapping, using heat welding, of the respective carrier sheets of adjacently installed membranes at the job site. In a second aspect of this seventh example embodiment, the carrier sheet further comprises a gas barrier layer, such as polyvinyl alcohol (PVOH). Thus, as another example, a multiplayer polymer laminate could comprise the laminate structure: LDPE/HDPE/PVOH/HDPE/LDPE. Between the polymer or copolymer layers of exemplary multi-layer carrier sheets, one may use tie coating materials as would be known in the laminate art.

In an eighth example embodiment, which may be based on any of the first through seventh example embodiments, the pressure sensitive adhesive comprises rubber modified bituminous adhesive or synthetic polymer.

In a ninth example embodiment, which may be based on any of the first through eighth example embodiments, the pressure sensitive adhesive of the membrane comprises a synthetic rubber or elastomer chosen from butyl rubber, polyisobutylene, styrene-isoprene-styrene (SIS), styrene-ethylene-butylene-styrene (SEBS), styrene-butadiene-styrene (SBS), styrene-butadiene rubber (SBR), amorphous polyolefin (APO), or a mixture of any of the foregoing.

In a tenth example embodiment, which may be based on any of the first through ninth example embodiments, aluminum oxide trihydrate (ATH) particles of the ATH layer of the membrane have a coating weight of 100 to 200 gram per square meter.

In an eleventh example embodiment, which may be based on any of the first through tenth example embodiments, the aluminum oxide trihydrate (ATH) particles have an average diameter of 50 to 200 microns; and, more preferably, 100 to 150 microns.

In a twelfth example embodiment, which may be based on any of the first through eleventh example embodiments, the protective top-coating layer comprises a film-forming polymer latex chosen from acrylate, polyvinyl acetate, acrylate/styrene copolymers, acrylate/vinyl acetate copolymers, and mixtures thereof. Acrylate polymers are most preferred.

In a thirteenth example embodiment, which may be based on any of the first through twelfth example embodiments, the protective top-coating layer has an average coating weight of 10 to 200 grams per square meter and an average thickness of 0.01 to 0.20 mm.

In a fourteenth example embodiment, which may be based on any of the first through thirteenth example embodiments, the protective top-coating layer further comprises at least one filler material in the amount of 20%-80% by weight.

In a fifteenth example embodiment, which may be based on any of the first through fourteenth example embodiments, the protective top-coating layer comprises at least one filler material chosen from calcium carbonate, magnesium carbonate, titanium dioxide, dolomite, wollastonite, barium sulfate, crystalline or amorphous silica, bentonites, talc, or mixture thereof.

In a sixteenth example embodiment, the invention provides a method for waterproofing a substrate, comprising: attaching onto a building or civil engineering surface the membrane according to any of claims 1 through 15. For example, the carrier sheet side is attached or otherwise positioned against a building surface, such as a foundation or lagging form, and concrete is subsequently cast against the top-coated pressure sensitive adhesive layer side of the membrane.

In a seventeenth example embodiment, the invention provides a method for waterproofing a substrate, comprising:

attaching onto a building or civil engineering surface a first membrane in accordance with any of claims 2 through 15, the first membrane comprising release liner or paper only along the side edges of the membrane; and attaching to a surface adjacent to the first membrane a second membrane also comprising release liner or paper only along the side edges of the second membrane; and sealing together the first and second membrane at overlapping portions.

A monolithic waterproofing barrier is established by sealing together two or more membranes, and concrete is cast against the two or more membranes.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: $R=RL+k*(RU-RL)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above, is also specifically disclosed.

EXEMPLIFICATIONS

Different Particulate Comparison

Four different kinds of inorganic particulate were scattered onto 0.30 mm thickness SIS based PSA layer, and over this was sprayed an acrylic coating at comparable coating weight (40-60 grams). After casting fresh concrete on the membrane, the specimen was cured for one week in moist chamber (23C, 90% RH), before testing initial BTC and starting water immersion. The initial bond to post-casted concrete (BTC) strength and bond to post-casted concrete strength after 2/4 weeks water immersion was tested according to ASTM D903 (180°, speed: 100 mm/min). The specimen scattered ATH showed best bonding performance comparing to the specimen scattered with hydrated cement, silica sand, and mullite powder.

TABLE 1

| | Initial BTC | BTC after water immersion (N/mm) | |
|---|---|---|---|
| | (N/mm) | 2 week | 4 week |
| 100 mesh ATH | 3.7 | 3.5 | 3.4 |
| 80-120 mesh white hydrated cement | 3.1 | 1.8 | 1.8 |
| 100 mesh silica sand | 2.3 | 1.2 | 0.9 |
| 100 mesh mullite | 2.2 | 0.3 | 0.3 |

Different Acrylate Coating Comparison

The particulate layer was prepared by scattering 100 mesh ATH particles onto 0.30 mm SIS-based PSA layer, and then spraying three different acrylate coatings on the ATH particle layer at comparable coating weight. The initial BTC, and BTC after UV aging and water immersion, were tested. The UV aging method involved the use of a QUV Accelerated Weathering Tester, testing conditions of UVA 340 nm, 0.68 w/m2/nm radiation and chamber temperature setting at 60±3C.

After 72 and 120 hours of UV aging, the samples were subjected to concrete cast against them, and BTC strength was tested after one week in moist chamber (23 C, 90% RH). From results set forth below, it can be seen that acrylate coating A showed the best performance comparing to coatings B and C.

The polymer structure, surfactant type and content, filler content, etc., are believed to be the factors which will most influence the bonding to concrete (BTC) performance of the membrane, especially the BTC after water immersion.

TABLE 2

| | Initial BTC | BTC after QUV aging (N/mm) | | BTC after water immersion (N/mm) | |
|---|---|---|---|---|---|
| | (N/mm) | 72 h | 120 h | 2 week | 4 week |
| Acrylate Coating A | 3.7 | 3.8 | 3.5 | 3.5 | 3.3 |
| Acrylate Coating B | 2.4 | 2.7 | 2.6 | 2.1 | 1.6 |
| Acrylate Coating C | 2.9 | 2.5 | 2.4 | 1.1 | 0.8 |

Performance of Different Prototypes

Three different prototypes were prepared. (1) 0.30 mm SIS based PSA scattered with 100 mesh ATH on the adhesive; (2) 0.30 mm SIS based PSA+PVAc coating with 30% of TiO2 as fillers; (3) 0.30 mm SIS based PSA+100 mesh ATH +acrylate coating. The initial BTC, BTC after UV aging and water immersion was tested. The UV aging method uses QUV Accelerated Weathering Tester, testing conditions of UVA 340 nm, 0.68 w/m2/nm radiation and chamber temperature setting at 60±3C. After 72 and 120 hours of UV aging, the samples were casted concrete and tested the BTC strength after one week in moist chamber (23 C, 90% RH).

The prototype of the present application showed best bonding performance, the BTC after water immersion and UV aging is very stable. The BTC after UV aging was comparable to the initial BTC strength and no cracks happened on the membrane after UV aging. The BTC after 2/4 weeks water immersion was stable as well.

"SIS+ATH" prototype showed fast decline after 2/4 week water immersion. The BTC strength was decreased from 2.7 N/mm to 1.9-2.0 N/mm after 2/4 weeks of water immersion. "SIS+ATH" also showed de-bonding from concrete after 120 h QUV aging. "SIS+PVAc" prototype also showed even faster decline in BTC after water immersion, from 3.4 N/mm to 1.1-1.2 N/mm after 2/4 weeks of water immersion. Even though the BTC strength was similar to the initial BTC strength, many cracks happened on the membrane surface after UV aging.

TABLE 3

| | Initial BTC (N/mm) | BTC after water immersion (N/mm) | | BTC after QUV aging (N/mm) | |
|---|---|---|---|---|---|
| | | 2 week | 4 week | 72 h | 120 h |
| Adhesive + ATH + Acrylate (Present Invention) | 3.1 | 2.8 | 3.2 | 3.3 (No cracks) | 3.1 (No cracks) |
| Adhesive + ATH | 2.7 | 1.9 | 2.0 | 2.7 | De-bond |
| Adhesive + PVAc (30% TiO2) | 3.4 | 1.2 | 1.1 | 3.0 (cracks) | 2.6 (cracks) |

The foregoing example and embodiments were present for illustrative purposes only and not intended to limit the scope of the invention.

We claim:

1. A membrane for waterproofing a substrate, comprising: a laminate construction wherein the laminate comprises a carrier sheet, a pressure-sensitive adhesive (PSA) layer, a particulate layer partially embedded into the PSA layer, and a protective top-coating layer attached to the particulate layer, the laminate having parallel side edges whereby the laminate construction can be rolled into a roll form along the side edges for shipment;

the carrier sheet having an average thickness of 0.20 to 2.0 mm;

the PSA layer attached to the carrier sheet and having an average thickness of 0.1 to 1.0 mm;

the particulate layer partially embedded into the PSA layer and comprising aluminum oxide trihydrate (ATH) particles having an average mean diameter of 50 to 200 microns, the particulate layer having a coating weight in the range of 10 to 300 grams per square meter; and the protective top-coating layer covering the partially embedded ATH particles and portion of unembedded PSA layer, and preventing the reactive particles from submarining into the PSA layer when the membrane is rolled for shipment, the protective top-coating layer optionally comprising nano-silica up to 0.25% by weight, the protective top-coating layer comprising a polymer chosen from acrylic, acrylate/styrene copolymer, acrylate/vinyl acetate copolymer, chloroprene, butyl rubber, styrene-butadiene copolymer, SEBS, or mixture thereof; and the protective top-coating layer further comprising a filler in the amount of 20% to 80% by weight and having an average thickness of 0.01 to 0.20 mm, wherein the protective top-coating layer exhibits 50 to 500% of elongation when measured after casting a 1.0-1.5 mm coating of the protective top-coating layer.

2. The membrane of claim 1 wherein the membrane does not have a release liner or paper except along the side edges of the membrane, which are devoid of pressure sensitive adhesive, particulates, and top coating.

3. The membrane of claim 1 wherein the carrier sheet comprises a polymer film, woven fabric, non-woven fabric, or combination thereof.

4. The membrane of claim 3 wherein the carrier sheet comprises a fabric sandwiched between two polymer films.

5. The membrane of claim 1 wherein the carrier sheet has an average thickness of 0.5 to 1.0 mm.

6. The membrane of claim 1 wherein the carrier sheet comprises polypropylene, polyethylene, ethylene-propylene copolymers, ethylene-olefin copolymers, ethylene-vinyl acetate copolymers, polyvinyl acetate, polyethylene tereph-thalate (PET), polyvinyl chloride (PVC), thermoplastic polyolefin (TPO), or a mixture of any of the foregoing polymers or co-polymers.

7. The membrane of claim 1 wherein the carrier sheet is a multilayer laminate having at least two layers, each of the at least two layers comprising a different polymer or polymer combination.

8. The membrane of claim 1 wherein the pressure sensitive adhesive comprises rubber modified bituminous adhesive or synthetic polymer.

9. The membrane of claim 8 wherein the pressure sensitive adhesive comprises butyl rubber, polyisobutylene, sty-rene-isoprene-styrene (SIS), styrene-ethylene-butylene-sty-rene (SEBS), styrene-butadiene-styrene (SBS), styrene-butadiene rubber (SBR), amorphous polyolefin (APO), or a mixture of any of the foregoing adhesives.

10. The membrane of claim 1 wherein the ATH particle layer has a coating weight of 100 to 200 gram per square meter.

11. The membrane of claim 10 wherein the ATH particles have an average diameter of 50 to 200 microns.

12. The membrane of claim 1 wherein the protective top-coating layer comprises a film-forming polymer latex chosen from acrylate, acrylate/styrene copolymers, acrylate/vinyl acetate copolymers, and mixtures thereof.

13. The membrane of claim 1 wherein the protective top-coating layer has an average coating weight of 10 to 200 gram per square meter and an average thickness of 0.01 to 0.20 mm.

14. The membrane of claim 1 wherein the protective top-coating layer comprises at least one filler material chosen from calcium carbonate, magnesium carbonate, titanium dioxide, dolomite, wollastonite, barium sulfate, crystalline or amorphous silica, bentonites, talc, or mixture thereof.

15. A method for waterproofing a substrate, the method comprising: attaching onto a building or civil engineering surface the membrane of claim 1.

16. A method for waterproofing a substrate, comprising:
   attaching onto a building or civil engineering surface a first membrane in accordance with claim 2, the first membrane comprising release liner or paper only along the side edges of the membrane; and
   attaching to a surface adjacent to the first membrane a second membrane also comprising release liner or paper only along the side edges of the second membrane; and
   sealing together the first and second membrane at overlapping portions.

17. The membrane of claim 1, wherein the membrane exhibits a membrane-to-membrane bonding strength of from 1.0 to 1.2 N/mm when tested in accordance with ASTM D1876 (2015).

\* \* \* \* \*